United States Patent [19]

Ohbuchi et al.

[11] Patent Number: 5,066,762

[45] Date of Patent: Nov. 19, 1991

[54] THERMOPLASTIC POLYURETHANE RESIN FROM P-PHENYLENE DIISOCYANATE, A POLY(HEXAMETHYLENE CARBONATE) POLYOL, AND A SHORT CHAIN POLYOL

[75] Inventors: Yukio Ohbuchi; Yoshiaki Maeda; Masahiro Kawasaki; Susumu Sato; Mamoru Akimoto, all of Yokohama, Japan

[73] Assignee: Nippon Polyurethane Industry Co., Ltd., Tokyo, Japan

[21] Appl. No.: 488,397

[22] Filed: Feb. 27, 1990

Related U.S. Application Data

[63] Continuation of Ser. No. 247,107, Sep. 20, 1988, abandoned.

[30] Foreign Application Priority Data

Oct. 6, 1987 [JP] Japan .................................. 62-250652

[51] Int. Cl.[5] ...................... C08G 18/10; C08G 18/20; C08G 18/24; C08G 18/44
[52] U.S. Cl. ........................................ 528/85; 528/53; 528/54; 528/58; 528/60; 528/65; 528/80; 528/81; 528/83
[58] Field of Search ...................... 528/85, 53, 54, 58, 528/60, 65, 80, 81, 83

[56] References Cited

U.S. PATENT DOCUMENTS

| 3,110,686 | 11/1963 | Newton | 521/172 |
| 3,526,572 | 9/1970 | Finelli | 220/456 |
| 3,544,524 | 12/1970 | Müller | 528/74 |
| 3,637,909 | 1/1972 | von Bonin et al. | 528/75 |
| 3,639,354 | 2/1972 | Müller et al. | 528/85 |
| 3,640,967 | 2/1972 | Konig et al. | 528/80 |
| 4,105,641 | 12/1978 | Buysch et al. | 526/712 |
| 4,349,657 | 9/1982 | Holloway | 156/314 |
| 4,483,974 | 11/1984 | Grogler | 528/68 |

FOREIGN PATENT DOCUMENTS 47-51599  1/1973  Japan.
58-4051   1/1983  Japan.
58-67717  4/1983  Japan.

OTHER PUBLICATIONS

Japanese Industrial Standard K 7311; 1977.
Japanese Industrial Standard K 6301; 1975.
Japanese Industrial Standard K 7206.

Primary Examiner—John Kight, III
Assistant Examiner—Dennis R. Daley
Attorney, Agent, or Firm—Davis Hoxie Faithfull & Hapgood

[57] ABSTRACT

A thermoplastic polyurethane resin is prepared by the reaction of
(A) p-phenylene diisocyanate,
(B) a hydroxyl terminated poly(hexamethylene carbonate) polyol having a molecular weight of 850 to 5000 and
(C) a short chain polyol having 2 to 10 carbon atoms as the chain extending agent, the molar ratio of (B) : (C) being 1:2 to 1:0.05, and the molar ratio of isocyanate groups : total active hydrogen groups being 0.93:1 to 1.20:1.

20 Claims, No Drawings

THERMOPLASTIC POLYURETHANE RESIN FROM P-PHENYLENE DIISOCYANATE, A POLY(HEXAMETHYLENE CARBONATE) POLYOL, AND A SHORT CHAIN POLYOL

This is a continuation of copending application Ser. No. 07/247,107 filed on Sept. 20, 1988, now abandoned.

BACKGROUND OF THE INVENTION

1. Field of the Invention

This invention relates to a thermoplastic polyurethane resin, more particularly to a thermoplastic polyurethane resin improved in hydrolysis resistance, heat deterioration resistance, temperature dependency and compression set.

2. Related Background Art

Thermoplastic polyurethane resins have excellent physical properties such as high tensile strength, high fatigue resistance, good low temperature flexibility, etc., and also good abrasion resistance and therefore have very excellent characteristics as compared with other thermoplastic resins.

Further, thermoplastic polyurethane resins are suitable for the production of articles of small size such as precise parts including packing, sound-damping gear, bearing, joint, parts for precise machines, automative parts, electronic instrument parts, etc. Also, they can be molded into belt, hose, tube, sheet, film, etc. by extrusion.

However, when compared with cast molded elastomers among urethane rubbers, the thermoplastic polyurethane resin is inferior in compression set, and particularly when employed for packings, deformation becomes greater to be inferior in sealing characteristic, whereby liquid leak, air leak, etc. may be caused to be lowered in performance as packing to cause a problem. Also, due to presence of temperature dependency, it has the drawbacks that hardness change is liable to occur, etc.

The temperature limit at which general thermoplastic polyurethane resins of the diphenylmethane diisocyanate (hereinafter abbreviated as MDI) type can be used is about 100° C. and for this reason, it has been desired to improve tubes, coatings, packings, etc. to be used around engines of automobiles under elevated temperatures atmosphere in aspect of heat resistance.

However, said polyurethane resins have excellent performances as compared with other thermoplastic resins (e.g. polyvinyl chloride type, polyester type, polystyrene type, etc.) concerning oil resistance, abrasion resistance, etc., and therefore when used as automobile parts, materials with little hardness change even at elevated temperatures have been desired. Among said thermoplastic resins which can be used under relatively higher temperatures, there is a polyester elastomer, but it is inferior in aspect of compression set, abrasion resistance, etc. as compared with thermoplastic polyurethane resins.

On the other hand, concerning thermoplastic polyurethane resins (hereinafter abbreviated as TPU), it has been known to improve hydrolysis resistance, heat resistance, etc. by use of a polycarbonate polyol, but most of these TPU use MDI as a diisocyanate component, and these MDI based polycarbonate type TPU had various drawbacks such as inferior low temperature characteristic, great temperature dependency of hardness, inferior compression set, poor impact resilience, etc., and it has been demanded to improve such drawbacks.

SUMMARY OF THE INVENTION

The present inventors have studied intensively in order to improve the drawbacks which could not be solved by the techniques of the prior art as mentioned above, namely heat aging resistance, temperature dependency of hardness, compression set, low temperature characteristic, etc., and consequently found that they can be improved by use of a specific polycarbonate polyol and a specific diisocyanate as the components constituting the thermoplastic polyurethane resin to accomplish the present invention.

According to the present invention, there is provided a thermoplastic polyurethane resin made from:

(A) p-phenylene diisocyanate,
(B) a hydroxyl terminated poly(hexamethylene carbonate) polyol having a molecular weight of 850 to 5000 and
(C) a short chain polyol having 2 to 10 carbon atoms as the chain extending agent, the molar ratio of (B):(C) being 1:2 to 1:0.05, and the molar ratio of isocyanate groups: total active hydrogen groups being 0.93:1 to 1.20:1.

DETAILED DESCRIPTION OF THE PREFERRED EMBODIMENTS

The poly(hexamethylene carbonate) polyol which can be used in the present invention has a molecular weight of 850 to 5000, more preferably 1000 to 3000. Said polyol can be obtained by condensation reaction of 1,6-hexaneglycol with diphenyl carbonate, diethyl carbonate, ethylene carbonate, etc. and has terminal hydroxyl groups.

Also, for imparting slightly crosslinks, by mixing a slight amount of triol such as glycerine, trimethylolpropane (hereinafter abbreviated as TMP), etc. upon carrying out the condensation reaction of 1,6-hexaneglycol with diphenyl carbonate, it can be modified to poly(hexamethylene carbonate) polyol having slightly trifunctionality, and this polyol can be also used in combination.

Also, poly(hexamethylene carbonate) polyol can be used in combination with poly(butylene adipate)polyol, polycaprolactone polyol, poly(hexamethylene adipate)polyol, etc. Polycarbonate polyols other than poly(hexamethylene carbonate) polyol such as a polycarbonate polyol derived from 1.5-pentane diol, 3-methyl-1.5-pentane diol, cyclohexanedimethanol, and the like can be used alone or in combination with poly(hexamethylene carbonate) polyol. However, the performance tends to be slightly lowered than the case when poly(hexamethylene carbonate) polyol is used alone.

The organic diisocyanate to be reacted with these poly(hexamethylene carbonate) polyols is p-phenylene diisocyanate (hereinafter called PPDI). This PPDI is very intractable, because it is a diisocyanate having an extremely high melting point of 95° C. and yet excessive sublimatability, which is also liable to convert dimer in the molten state.

As the chain-extending agent to be used in the present invention, short chain polyols having 2 to 10 carbon atoms are used. For example, there may be included ethylene glycol, 1,3-propylene glycol, 1,4-butanediol, neopentyl glycol, 3-methyl-1,5-pentanediol, p-xylene glycol, 1,4-bis-(β-hydroxyethoxy)benzene, 1,3-bis-(β-hydroxyethoxy)benzene, cyclohexane 1,4-dimethanol, octane-1,8-diol, decane-1,10-diol, etc., and these can be either alone or as a mixture of two or more kinds. Particularly preferred chain extending agents are 1,4-butanediol, 1.4-bis(β-hydroxyethoxy)benzene, etc.

For introducing slightly crosslinkage into the resin according to the present invention, triols such as TMP, glycerine, hexane-1,2,6-triol can be contained in the above diol, if necessary.

The isocyanate group and the active hydrogen as determined by the Zerewitinoff method, in the method of the present invention, must maintain the stoichiometric ratio, and the molar ratio of isocyanate groups to active hydrogen groups may be 0.93:1 to 1.20:1, preferably 0.98:1 to 1.10:1.

Also, by maintaining the molar ratio of poly(hexamethylene carbonate) polyol to the chain-extending agent used in the present invention at 1:2 to 1:0.05, preferably 1:1 to 1:0.1, excellent physical properties can be obtained. By varying the above ratio of poly(hexamethylene carbonate) polyol to the chain-extending agent, the molecular weight of the poly(hexamethylene carbonate) polyol and the kind of the chain-extending agent, a thermoplastic polyurethane resin having any desired hardness can be obtained.

The thermoplastic polyurethane resin according to the present invention can be mixed with additives such as antioxidants, lubricants, stabilizers, pigments, flame retardants, weathering resistance improving agents, etc., if necessary, at a suitable stage of the preparation.

Particularly, in the preparation by use of a poly(hexamethylene carbonate) polyol having a large molecular weight or when the ratio of the chain extending agent is small, a tertiary organic amine catalyst, organic tin catalyst, etc. can be used. Typical tertiary organic amine catalysts may include triethylamine, triethylenediamine, N,N,N',N'-tetramethylethylenediamine, N-methylmorpholine, etc. and analogues thereof. Typical organic tin catalysts may include stannous octoate, stannous oleate, dibutyltin dilaurate, dibutyltin octoate and analogues thereof.

The method for preparing the thermoplastic polyurethane resin according to the present invention may be classified into the two methods of the one shot method and the prepolymer method. In practicing the present invention, the resin obtained according to the one shot method exhibited such tendencies that crystallinity is strong, that the melting characteristics during heat molding are inferior and yet that it is liable to become a brittle resin.

Accordingly, the thermoplastic polyurethane resin according to the present invention is preferably made according to the prepolymer method. When the preparation is carried out according to the prepolymer method, the desired thermoplastic polyurethane resin can be prepared irrespectively of whether it may be either the batch system or the continuous system. Also, PPDI has a very high melting point, is susceptible to denaturation in the molten state and further PPDI has the property of being very readily sublimated in the molten state. Since the amounts of the starting materials to be used are required to be controlled accurately in the preparation according to the present invention, use of PPDI in the molten state will cause a problem in aspect of stoichiometric amounts of the isocyanate component and the active hydrogen component. Therefore, in obtaining the thermoplastic polyurethane resin of the present invention, for avoiding the above problem, PPDI should be preferably used in form of flakes.

In the case of the batch system, when a prepolymer is synthesized from a poly(hexamethylene carbonate) polyol and PPDI and the resulting prepolymer is allowed to react with the chain-extending agent or the chain-extending agent and an additional amount of the poly(hexamethylene carbonate) polyol, since the viscosity of the above prepolymer is extremely high, it is suitable to perform the preparation by means of a two-arm type kneader having strong stirring force. As the preparation method by use of such kneader, there is a useful preparation method as disclosed in Japanese Patent Publication No. 56-43245.

Preparations of prepolymers in the present invention can be effected, in either the method of using the reaction vessel or the pressure kneader, at a reaction temperature of 65° C. to 95° C. for a reaction time of 15 minutes to 30 minutes. In this case, if the molar ratio of the isocyanate groups: active hydrogen groups becomes in excess of 2:1 to make isocyanate groups more in amount, PPDI will be sublimated at a temperature of 90° C. or higher, whereby the ratio of the isocyanate to active hydrogen groups is changed and no excellent physical property can be obtained undersirably. Therefore, in such case, it is necessary to maintain the prepolymer temperature at 80° C. or lower.

Also, in the preparation of the polyurethane resin according to the prepolymer system, the reaction of PPDI and poly(hexamethylene carbonate) polyol can be also carried out by means of a two-arm type kneader to prepare the prepolymer, and subsequently reacting the prepolymer with a chain-extending agent or a chain-extending agent and an additional amount of poly(hexamethylene carbonate).

In the case of the continuous system, the prepolymer has high viscosity and therefore poured onto a belt conveyor continuously through a gear pump or a snake pump for high viscosity, and the chain extending agent through a gear pump for low viscosity, continuously while being mixed by a mixing head. The mixture poured onto the belt conveyor is heated continuously in a hot air drying furnace of 140° C. to 170° C., whereby the reaction proceeds. The resulting belt-shaped solid product is pulverized into flakes through a pulverizer. After sufficient curing by heating, the product can be granulated through an extruder into strand pellets or granular pellets to give the desired thermoplastic polyurethane resin.

The above method is the continuous process in which polymerization is carried out under stationary state, and there is also the so-called continuous stationary polymerization disclosed in Japanese Patent Publication No. 43-5920.

Other than the above methods, it is also possible to perform continuous polymerization according to the prepolymer method by means of a multi-axial extruder. The preparation methods by multi-axial extruder include those of Japanese Patent Publications Nos. 44-25600 and 56-5244, etc., and either method may be applicable. Also, as a special example, the preparation by means of a planetary roller extruder is also possible. The preparation is also possible by a cokneader as disclosed in Japanese Patent Publication No. 49-31760.

The present invention has specific features as shown below which could not be solved by the thermoplastic polyurethane resin of the prior art, and is very useful as parts for industrial uses, parts for automotive uses, etc.

1. It has excellent heat aging resistance, and can be used even under the temperature condition of 150° C.

2. It has extremely excellent in compression permanent set as compared with the thermoplastic elastomer of the prior art.

3. It has extremely small temperature dependency of hardness as compared with the elastomer of the prior art. 4. It has extremely good resistance for hot water.

5. It has good resistance for abrasion.

6. It has good workability such as of injection molding, extrusion molding, etc.

From the specific features as described above, the resin according to the present invention can be molded with good productivity by injecting molding into industrial parts to be used at elevated temperatures (packing, O-ring, etc.), automotive parts (damper, bush, boots, etc.) and others.

The belts, tubes molded by the extrusion molding can stand uses at elevated temperatures.

Further, the resin according to the present invention can give Spandex having good thermal stability and good steam resistance by the melt spinning.

EXAMPLES

The present invention is described below in more detail by referring to Examples and Comparative Examples. Unless otherwise noted, "parts" and "%" are "parts by weight" and "% by weight", respectively.

EXAMPLE 1

The reaction was carried out between 2010 g of a desiccated poly(hexamethylene carbonate) polyol having terminal hydroxyl groups and a molecular weight of 2010 obtained by the condensation reaction of 1,6-hexaneglycol and diethyl carbonate and 336 g of PPDI with stirring in a vessel equipped with a stirrer while maintaining the liquid temperature at 80° C. for 20 minutes to prepare a prepolymer containing 3.8% of NCO.

The prepolymer (2900 g) thus prepared was charged into a 3-liter pressure kneader (equipped with a pressurizing device), and stirring was effected while maintaining the temperature of the prepolymer at 90° C., and 111 g of 1,4-butanediol sufficiently desiccated was added to carry out the reaction. With the progress of the reaction, the temperature was elevated by the reaction heat and the viscosity was abruptly increased. The resin formed was gradually solidified to become raised up. At that stage, cooling water was passed through the jacket of the kneader, and the pressurizing lid was gradually descended to effect pressurization. The reaction product was gradually pulverized finely, and a polyurethane resin in fine powder was obtained until 30 minutes after initiation of the reaction. The resin obtained was further subjected to curing by heating at 105° C. for 16 hours. The powdery resin formed can be also worked as such by extrusion molding, injecting molding, but granulation was performed by extrusion molding to give pellets having good shapes. The pellets obtained were injection molded with extremely good moldability. Test strips (sheets of 112×112×2 mm) were prepared by injection molding, and physical properties were tested to obtain the results shown in Table 1. Also, the pellets could be molded into belts, sheets, tubes, etc. by extrusion molding. These products were free from fish eye, and have good surface characteristic, etc.

EXAMPLE 2

Into a 3-liter pressure kneader was charged 2500 g of the same poly(hexamethylene carbonate) polyol as used in Example 1, and 418 g of PPDI shaped in flakes was charged with stirring at 80° C. With the progress of the reaction, PPDI was completely dissolved, and the reaction mixture became increased in viscosity. When the NCO content was measured after the reaction for 20 minutes, the NCO content was found to be 3.7%, and a prepolymer having a NCO content in substantial agreement with the theoretical NCO content of 3.9% could be obtained.

Subsequently, with stirring being continued, at the point when the temperature of the prepolymer became 90° C., 112 g of 1,4-butanediol was added to carry out the chain-extending reaction. With the progress of the reaction, the temperature was elevated by the reaction heat, and the viscosity was also abruptly increased. The resin formed became gradually solidified. Subsequent treatment procedures were conducted in the same manner as in Example 1. Granulation was effected by the extrusion molding, and pellets having good shapes could be obtained.

The pellets obtained had excellent moldability similarly as in Example 1. The results of measurement of physical properties of the test strips obtained by injection molding similarly as in Example 1 are shown in Table 1. The resin also had very good extrusion moldability.

EXAMPLE 3

The prepolymer obtained according to the same method as in Example 1 was delivered through a high viscosity gear pump at 1667 g/min, and 1,4-butanediol through a low viscosity gear pump at 63.8 g/min, to a mixing head at the same time. The reaction mixture admixed continuously in the mixing head was poured onto a belt conveyer, and the reaction mixture was continuously heated in a hot air drying furnace of 160° C., in which the resin formation proceeded with the progress of the reaction. The belt-shaped solid product obtained was pulverized into flakes through a pulverizer. Further, the resin pulverized into flakes was post-cured at 105° C. for 16 hours, followed by granulation by the extrusion molding to give pellets having good shapes.

The pellets obtained had good injection moldability similarly as in Example 1. The results of measurement of the physical properties of the test strips obtained by extrusion molding are shown in Table 1. The resin also had good extrusion moldability.

COMPARATIVE EXAMPLE 1

The reaction was carried out in the same device as in Example 1 between 2010 g of the same desiccated poly(hexamethylene carbonate) polyol as used in Example 1 and 1030 g of MDI to prepare a pseudoprepolymer having an NCO content of 8.5%. The pseudoprepolymer (2500 g) was charged into a 3-liter pressure kneader, and stirring was conducted while maintaining the temperature of the prepolymer at 90° C., and 226 g of sufficiently desiccated 1,4-butanediol was added thereto to carry out the reaction. The product was pelletized according to the same preparation steps as in Example 1, and test strips were obtained according to the same method as in Example 1. The results of testing of the physical properties are shown in Table 1.

COMPARATIVE EXAMPLE 2

The reaction was carried out in the same device as in Example 1 between 2010 g of the same desiccated poly(hexamethylene carbonate) polyol as used in Example 1 and 776 g of tolidine-diisocyanate to prepare a pseudo-prepolymer having an NCO content of 5.7%. The pseudoprepolymer (2900 g) was charged into a 3-liter pressure kneader, and stirring was conducted while maintaining the temperature of the prepolymer at 110° C., and 168 g of sufficiently desicated 1,4-butanediol was added thereto to carry out the reaction. The product was pelletized according to the same preparation steps as in Example 1, and test strips were obtained according to the same method as in Example 1. The results of testing of the physical properties are shown in Table 1.

COMPARATIVE EXAMPLE 3

The reaction was carried out in the same device as in Example 1 between 2000 g of a desiccated polycaprolactone polyol having an average molecular weight of 2000 and 336 g of PPDI to prepare a prepolymer having a NCO content of 3.8%. The prepolymer (2900 g) was charged into a 3-liter pressure kneader, and stirring was conducted while maintaining the temperature of the prepolymer at 90° C., and 111 g of sufficiently desiccated 1,4-butanediol was added thereto to carry out the reaction. Pelletizing was conducted according to the same steps as in Example 1 to obtain test strips. The results of testing of physical properties are shown in Table 1.

COMPARATIVE EXAMPLE 4

The reaction was carried out in the same device as in Example 1 between 2000 g of a desiccated polycaprolactone polyol having an average molecular weight of 2000 and 1181 g of MDI to prepare a pseudo-prepolymer having an NCO content of 9.8%. The pseudoprepolymer (3000 g) was charged into a 3-liter pressure kneader, and stirring was conducted while maintaining the temperature of the prepolymer at 90° C., and 297 g of sufficiently desiccated 1,4-butanediol was added thereto to carry out the reaction. Pelletizing was conducted according to the same steps as in Example 1 to obtain test strips. The results of testing of physical properties are shown in Table 1.

EXAMPLE 4

By use of the same device and method as in Example 2, 2500 g of a 1,6-hexanepolycarbonate polyol having a molecular weight of 2010 and 418 g of PPDI were charged to obtain a prepolymer having an NCO content of 3.8%. Subsequently, when the temperature of the prepolymer became 95° C., 246 g of 1,4-bis($\beta$-hydroxyethoxy)benzene was added to carry out the chain extending reaction. Following subsequently the same preparation steps as in Example 1, pelletizing was effected to obtain test strips. The results of testing of the physical properties are shown in Table 1.

EXAMPLE 5

Into a 3-liter pressure kneader were charged 2250 g of sufficiently desiccated poly(hexamethylene carbonate) polyol having a molecular weight of 3000, and 252 g of PPDI were charged under stirring similarly as in Example 2, to obtain a prepolymer having an NCO content of 2.7% (the theoretical NCO content=2.8%). When the temperature of the prepolymer became 85° C., 750 g of poly(hexamethylene carbonate) polyol having a molecular weight of 3000 and 99 g of 1,4-bis($\beta$-hydroxyethoxy)benzene were added to carry out the chain extending reaction. Following subsequently the same preparation steps as in Example 1, pelletizing was effected to obtain test strips. The results of testing of the physical properties are shown in Table 1.

EXAMPLE 6

Into a 3-liter pressure kneader were charged 2020 g of sufficiently desiccated poly(hexamethylene carbonate) polyol having a molecular weight of 1010, and 672 g of PPDI shaped in flakes were charged, followed by the reaction at 80° C. for about 20 minutes to obtain a pseudoprepolymer having an NCO content of 6.8% (the theoretical NCO content=6.9%). Next, when the temperature of the prepolymer became 80° C., 180 g of 1,4-butanediol was added to carry out the chain extending reaction. Following subsequently the same preparation steps as in Example 1, pelletizing was effected to obtain test strips. The results of testing of the physical properties are shown in Table 1.

TABLE 1

| Item | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| Hardness[1] | Hs (JIS A) | 91 | 90 | 91 | 90 | 73 | 95 | 91 | 92 | 90 | 90 |
| 100% Tensile[1] Stress | Kgf/cm$^2$ | 87 | 94 | 93 | 97 | 44 | 120 | 95 | 97 | 86 | 78 |
| 300% Tensile[1] Stress | Kgf/cm$^2$ | 159 | 181 | 175 | 184 | 129 | | 384 | 222 | 128 | 153 |
| Tensile[1] Strength | Kgf/cm$^2$ | 400 | 386 | 420 | 422 | 330 | 350 | 470 | 381 | 376 | 380 |
| Elongation[1] | % | 530 | 500 | 500 | 570 | 650 | 500 | 350 | 410 | 600 | 520 |
| Tear Strength[1] | Kgf/cm | 117 | 128 | 115 | 123 | 101 | 155 | 108 | 110 | 120 | 118 |
| Compression[2] Set | % | 27 | 26 | 25 | 26 | 27 | 30 | 39 | 36 | 28 | 40 |
| Impact[1] Resilience | % | 62 | 65 | 64 | 63 | 65 | 60 | 27 | 47 | 74 | 39 |
| Softening[3] Temperature | °C. | 150 | 151 | 152 | 153 | 130 | 150 | 87 | 148 | 147 | 108 |
| Heat Aging[4] Test | | | | | | | | | | | |
| 150° C. × 14 days | % | 90 | 92 | 95 | 93 | 85 | 95 | 60 | 80 | 58 | 13 |
| 150° C. × 28 days | % | 83 | 85 | 87 | 85 | 70 | 89 | 40 | 65 | 40 | 7 |
| Hardness[1] Temperature Dependency | Hs (JIS A) | | | | | | | | | | |
| −20° C. | | 96 | 95 | 95 | 96 | 79 | 99 | 99 | 95 | 95 | 99 |

TABLE 1-continued

| Item | | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|
| 25° C. | | 91 | 90 | 90 | 90 | 73 | 95 | 91 | 92 | 90 | 90 |
| 70° C. | | 90 | 89 | 89 | 90 | 72 | 95 | 88 | 90 | 88 | 86 |
| 120° C. | | 90 | 89 | 89 | 90 | 70 | 93 | 85 | 87 | 86 | 78 |
| 150° C. | | 86 | 85 | 86 | 87 | 67 | 90 | 69 | 80 | 79 | 60 |
| Hot Water[5] Resistance | % | 62 | 60 | 63 | 65 | 50 | 75 | 45 | 45 | 10 | Destroyed |
| Tg (Dynamic Viscoelasticity) | E'' (°C.) Peak | −26 | −27 | −26 | −27 | −36 | −20 | −19 | −17 | −40 | −20 |
| Abrasion[6] Loss | mg | 23 | 27 | 26 | 24 | 20 | 40 | 65 | 50 | 60 | 44 |

Note to Table 1
[1]According to JIS K 7311
[2]70° C. × 22 hours, 25% compression according to JIS K 6301
[3]According to JIS K 7206
[4]Tensile strength retentivity according to JIS K 6301
[5]Dipped at 98-100° C. × 500 hours, tensile strength retentivity
[6]JIS K 7311, abrasion ring H-22, 1 Kg load, 1000 times

We claim:

1. A thermoplastic polyurethane resin which is the product of reacting:
   (A) p-phenylene diisocyanate,
   (B) a hydroxyl terminated poly(hexamethylene carbonate) polyol having a molecular weight of from 850 to 5000 which is obtained by the reaction of 1,6-hexane diol and carbonic acid esters, and
   (C) a short chain polyol having from 2 to 10 carbon atoms as a chain extending agent,
   wherein the molar ratio of (B) to (C) is from 1:2 to 1:0.05, and the molar ratio of isocyanate groups to total active hydrogen groups is from 0.93:1 to 1.20:1.

2. A thermoplastic polyurethane resin according to claim 1, wherein the molar ratio of (B):(C) is 1:1 to 1:0.1.

3. A thermoplastic polyurethane resin according to claim 1, wherein the molar ratio of isocyanate groups to total active hydrogen groups of the components (B) and (C) is from 0.98:1 to 1.10:1.

4. A thermoplastic polyurethane resin according to claim 1 wherein the poly(hexamethylene carbonate) polyol has a molecular weight of from 1000 to 3000.

5. A thermoplastic polyurethane resin according to claim 1 wherein component (B) was obtained by a condensation reaction of 1,6-hexaneglycol with a compound selected from the group consisting of diphenyl carbonate, diethyl carbonate and ethylene carbonate.

6. A thermoplastic resin according to claim 5 wherein component (B) was obtained by a condensation reaction of 1,6-hexaneglycol with a mixture of diphenyl carbonate and a slight amount of a triol.

7. A thermoplastic polyurethane resin according to claim 6 wherein the triol is selected from the group consisting of glycerine and trimethylolpropane.

8. A thermoplastic polyurethane resin according to claim 1 wherein the poly(hexamethylene carbonate) polyol is in combination with a polyol which is selected from the group consisting of poly(butylene adipate) polyol, polycaprolactone polyol and poly(hexamethylene adipate) polyol.

9. A thermoplastic polyurethane resin according to claim 1 wherein component C is selected from the group consisting of ethylene glycol, 1,3-propylene glycol, 1,4-butanediol, neopentyl glycol, 3-methyl-1,5-pentanediol, p-xylene glycol, 1,4-bis-($\beta$-hydroxyethoxy) benzene, cyclohexane 1,4-dimethanol, octane-1,8-diol, and decane-1,10-diol.

10. A thermoplastic polyurethane resin according to claim 9 wherein the short chain polyol is selected from the group consisting of 1,4-butanediol, and 1,4-bis-(beta-hydroxyethoxy) benzene.

11. A thermoplastic polyurethane resin according to claim 1 further wherein component C is a mixture of a diol and a triol, which triol is selected from the group consisting of trimethylolpropane, glycerine, and hexane-1,2,6-triol.

12. A thermoplastic polyurethane resin according to claim 1 wherein the resin was prepared by use of a tertiary organic amine catalyst.

13. A thermoplastic polyurethane resin according to claim 12 wherein the resin was prepared by use of a tertiary organic amine catalyst which is selected from the group consisting of triethylamine, triethylenediamine, N,N,N',N',-tetramethylethylenediamine and N-methylmorpholine.

14. A thermoplastic polyurethane resin according to claim 1 wherein the resin was prepared by use of an organic tin catalyst which is selected from the group consisting of stannous octoate, stannous oleate, dibutyltin dilaurate, and dibutyltin octoate.

15. A thermoplastic polyurethane resin according to claim 1 wherein the resin was prepared by the prepolymer method.

16. A process for preparing a thermoplastic polyurethane resin comprising reacting:
   (A) p-phenylene diisocyanate,
   (B) a hydroxyl terminated poly(hexamethylene carbonate) polyol having a molecular weight of from 850 to 5000 which is obtained by the reaction of 1,6-hexane diol and carbonic acid esters, and
   (C) a short chain polyol having from 2 to 10 carbon atoms as a chain extending agent,
   wherein the molar ratio of (B) to (C) is from 1:2 to 1:0.05, and the molar ratio of isocyanate groups to total active hydrogen groups is from 0.93:1 to 1.20:1.

17. A process according to claim 16 wherein the molar ratio of (B) to (C) is from 1:1 to 1:0.1.

18. A process according to claim 16 wherein the molar ratio of isocyanate groups to total active hydrogen groups is from 0.98:1 to 1.10:1.

19. A process according to claim 16 wherein (B) is obtained by a condensation reaction of 1,6-hexaneglycol with a compound selected from the group consisting of diphenyl carbonate, diethyl carbonate and ethylene carbonate.

20. A process according to claim 19 wherein (B) is obtained by a condensation reaction of 1,6-hexaneglycol with a mixture of diphenyl carbonate and a slight amount of triol.

* * * * *

UNITED STATES PATENT AND TRADEMARK OFFICE
CERTIFICATE OF CORRECTION

PATENT NO. : 5,066,762
DATED : November 19, 1991
INVENTOR(S) : Ohbuchi et al.

It is certified that error appears in the above-identified patent and that said Letters Patent is hereby corrected as shown below:

In column 5, line 12: delete --injecting-- and insert "injection".

In column 5, line 54: delete --injecting-- and insert "injection".

Signed and Sealed this

Ninth Day of March, 1993

*Attest:*

STEPHEN G. KUNIN

*Attesting Officer*    Acting Commissioner of Patents and Trademarks